Oct. 5, 1965   C. D. FLANAGAN   3,210,607
FERROELECTRIC CAPACITOR APPARATUS
Filed Sept. 7, 1961   3 Sheets-Sheet 1

Charles D. Flanagan,
Inventor
Koenig Pope Senniger and Powers,
Attorneys.

Oct. 5, 1965   C. D. FLANAGAN   3,210,607
FERROELECTRIC CAPACITOR APPARATUS
Filed Sept. 7, 1961   3 Sheets-Sheet 3

Charles D. Flanagan,
Inventor
Koenig Pope Senniger and Powers,
Attorneys.

United States Patent Office 3,210,607
Patented Oct. 5, 1965

3,210,607
FERROELECTRIC CAPACITOR APPARATUS
Charles D. Flanagan, Attleboro, Mass., assignor to Texas Instruments Incorporated, Dallas, Tex., a corporation of Delaware
Filed Sept. 7, 1961, Ser. No. 136,560
21 Claims. (Cl. 317—40)

This invention relates to ferroelectric capacitor apparatus, and with regard to certain more specific features, to improved temperature-sensing electrical control systems incorporating such apparatus.

Among the several objects of the invention may be noted the provision of temperature-sensitive ferroelectric capacitor apparatus; and the provision of an improved temperature-sensitive relay circuit means employing such apparatus, adapted among other uses for the improved protection of motors or other devices subject to damage upon overheating. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, FIG. 1 is a chart which plots against rising temperatures the capacitances of two different ferroelectric materials useful in carrying out the invention;

Corresponding reference characters indicate corresponding parts throughout the several views of the drawings.

Ferroelectric materials such as, for example, barium titanate ($BaTiO_3$), or solid solutions thereof with strontium titanate ($SrTiO_3$), have dielectric constants such that when placed between electrode plates to form capacitors, the capacitors exhibit varying capacitances with varying temperatures. Barium titanate, and solid solutions thereof with strontium titanate, also have Curie temperature points in temperature ranges which I have found to be of value in constructing temperature-sensing and control systems such as motor-protective or other protective systems subject to overheating conditions. Curie temperatures are those at which the materials suddenly change their ferroelectric properties. However, individual use of either substance as a capacitor in such a system, while perhaps of some theoretical value, is of little practical value because the individual Curie effect is not sustained over any useful temperature range. The result is that desired control is generally lost upon a so-called temperature overshoot of the device to be protected.

According to the present invention, ferroelectric materials such as, for example, those above mentioned, having different Curie point temperatures, are connected as capacitor means in an alternating-current circuit of the inductive-capacitive or so-called L/C type, the circuit also containing for example a relay coil which provides a substantial part of the inductance (represented by the letter L). The capacitance is represented by the letter C. The values of L and C in a given A.C. circuit are selected so that the inductive reactance of the coil and of the capacitive reactance of the capacitor means at the Curie point are so matched at or near a critical control temperature of the capacitor means that the A.C. circuit will resonate at or about the A.C. frequency applied to the L/C circuit. As a result, over a wide range of safe temperatures the coil will be served with current so as to maintain a protective relay switch in one position but at a critical temperature will suddenly have its current changed to reset the switch to perform its control function. The two different ferrolelectric materials maintain control functions upon temperature overshoot of the device protected by the relay, which otherwise would not be the case.

Figure 1:
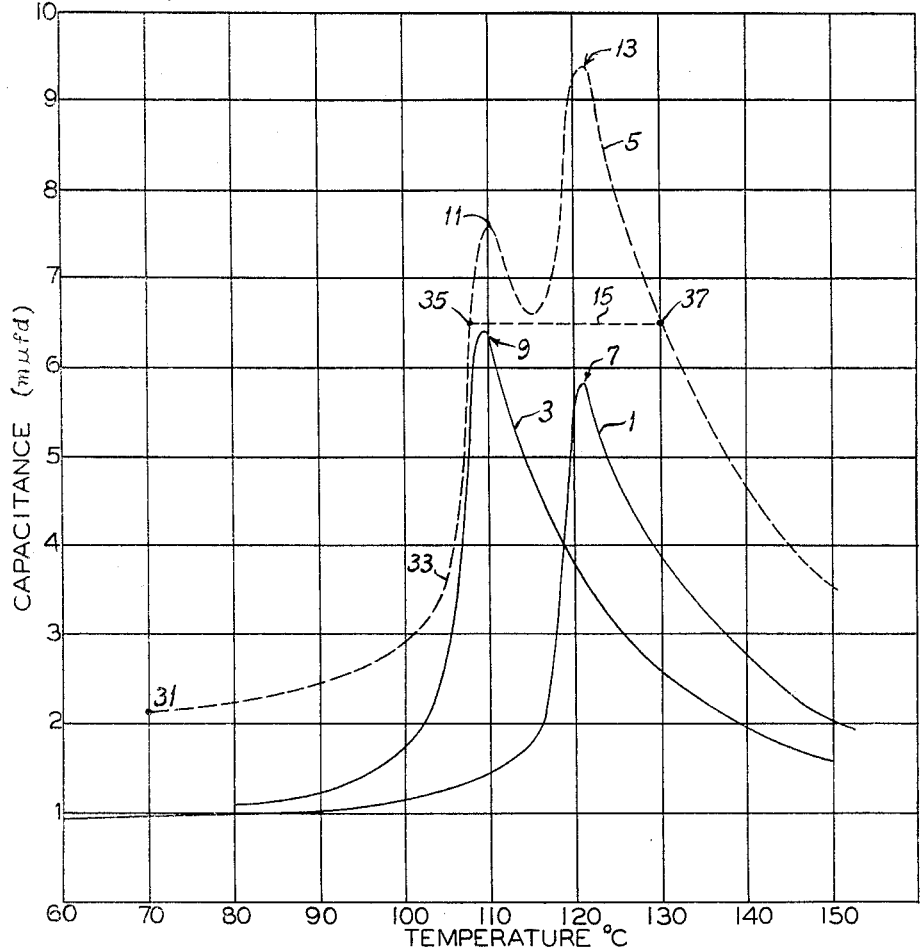

Referring to FIG. 1, the abscissae represent temperature in ° C. as an independent variable. The ordinates represent capacitance as a dependent variable in millimicrofarads (m$\mu$fd.). Curve 1 is a plot of the dependent variable for a given thickness of $BaTiO_3$ and curve 3 plots it for a given thickness for a solid solution of 97% $BaTiO_3$ and 3% $SrTiO_3$ by weight. Curve 5 represents the capacitance of these same substances connected in parallel, which is to say that curve 5 represents the sum of the capacitances shown by curves 1 and 3. Therefore, if these substances are arranged in parallel as capacitance in an A.C. circuit, the capacitance of the circuit from this composite source will be according to curve 5. If the same substances were connected in series-circuit relation, another shape would be found for curve 5 which, although not preferred, would nevertheless be quite useful in the same configuration of circuit in which the substances are arranged in parallel.

It will be seen from the above that if the barium titanate alone of curve 1 were to be made up as such into a capacitor, its variable capacitance would peak as shown at 7; and if the solid solution of curve 3 were to be made up alone as a capacitor, its variable capacitance would peak as shown at 9. On the other hand, if both of said layers are employed in parallel to make up the capacitance as above described, the resulting variable capacitance peaks twice as at 11 and 13. But there is a temperature range of approximately 22° C., represented by dotted line 15, for example, throughout which the capacitance of the combination is substained at a valve no less than about 6.5 m$\mu$fd. Thus by inserting such composite capacitor means into a circuit, a small increase in temperature, for example 3° C. (from 105° C. to 108° C.) corresponds to a rapid rise in capacitance from a value of 3.75 m$\mu$fd. to a value of at least 6.5 m$\mu$fd., which is maintained over said temperature range of 22° C. as may be seen from FIG. 1.

Figure 2:
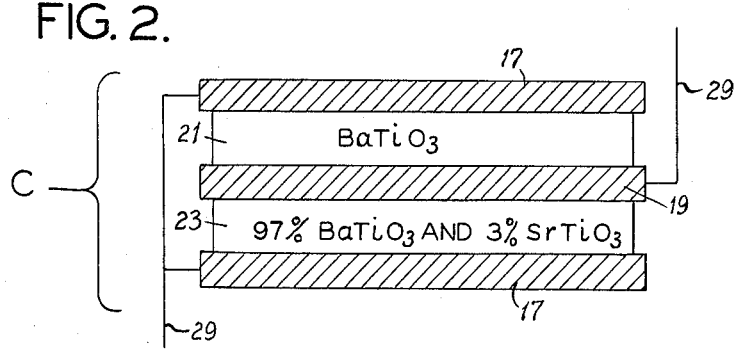
FIG. 2 is a diagrammatic view of one form of composite capacitor made according to the invention.

At C in FIG. 2 is shown one form of capacitor made according to the invention, in which numeral 21 illustrates a plate or layer of barium titanate ferroelectric material ($BaTiO_3$) and numeral 23 illustrates a plate or layer of the above-described composite ferroelectric material (97% $BaTiO_3$ and 3% $SrTiO_3$), as labeled. A conductive plate or electrode 19 separates plates 21 and 23 and is connected to one side of an A.C. circuit 29. Conductive plates or electrodes 17 contact the outsides of the plates 21 and 23, respectively, being commonly connected to the other side of A.C. circuit 29. This locates the plates 21 and 23 as capacitances in parallel in the A.C. circuit 29.

Figure 3:
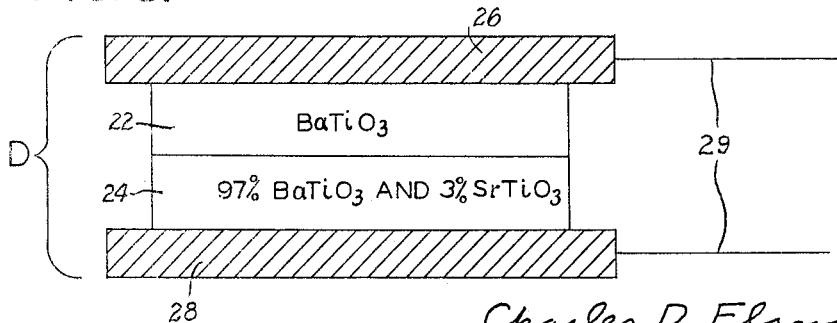
FIG. 3 is a view similar to FIG. 2, showing another form of said composite capacitor.

At D in FIG. 3 is illustrated another form of capacitor, in which a plate of barium titanate 22 and a plate 24 of the composite material are connected in series, being located between conductive plates 26 and 28. In this form, the plates 22 and 24 are in series-circuit relation in the circuit 29. If desired, a conductive plate may be sandwiched between plates 26 and 28. Plates 26 and 28 (FIG. 3) and plates 7 and 19 (FIG. 2) are in the nature of plate-type electrodes.

Figure 4:
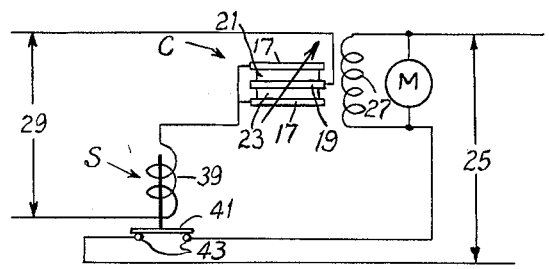
FIG. 4 is a diagram of a motor-protection circuit illustrating an application of the invention employing the FIG. 2 ferroelectric capacitor and a series-resonant circuit configuration.

In FIG. 4 is illustrated a typical circuit employing the invention for motor overload protection. In this figure, like numerals designate like parts with respect to the form of capacitor shown at C in FIG. 2. At M in FIG. 4 is a motor connected across a power supply circuit 25. Motor field windings are illustrated generally at 27. These may include start windings, as the case may be. Such windings are subject to damage upon overheating under various conditions such as motor overload, a locked rotor or the like. It is desired to open the line 25 when such overheating occurs so as to remove the motor from the line. When an overheating motor is cut from a line such as 25, there is sometimes an overshoot in its rising temperature. The present invention takes this into account.

The composite capacitor C is placed in heat-exchange relationship with respect to the windings 27. The arrow drawn on the capacitor C in FIG. 4 indicates that its capacity is a function of its temperature.

The capacitor C is located in A.C. circuit 29, in which a relay coil 39 is connected in series therewith. Coil 39, when carrying sufficient current for the purpose, opens a normally closed switch 41, the contacts 43 of which are in motor circuit 25. The entire relay switch 39, 41, 43 is labeled S. Since the A.C. circuit 29 includes capacitance afforded by the composite capacitor C and inductance afforded by the coil 39, it is of the so-called L/C variety. The coil 39 is designated for an inductive reactance at or near the capacitive reactance of C when the latter is under critical temperature conditions represented at, for example, point 35 in FIG. 1. The circuit will then have approximately peak resonance under such conditions, and a comparatively rapid change will be effected in the current carried by circuit 29 from a small value which is not effective to open the switch 41 to a substantially larger value which becomes effective to open said switch. If the temperature of the motor windings 27 overshoots after the switch 41 opens, the switch 41 will be held open because the circuit 29 will continue to be under conditions of inductance and capacitance to maintain the necessary flow of current (note the dotted line 15 in FIG. 1). At temperatures below said critical temperature corresponding to point 35 (FIG. 1), the circuit 29 will not carry sufficient current to hold open the switch 41. This switch therefore remains closed and the motor remains on the line 25. In view of the above, the advantage on FIG. 1 of the shape of line 31–33–35–37 is apparent, for it has a steep front 33–35 and an arbitrary flat top 35–37 under the peaks 11, 13 and the valley therebetween.

Figure 5:
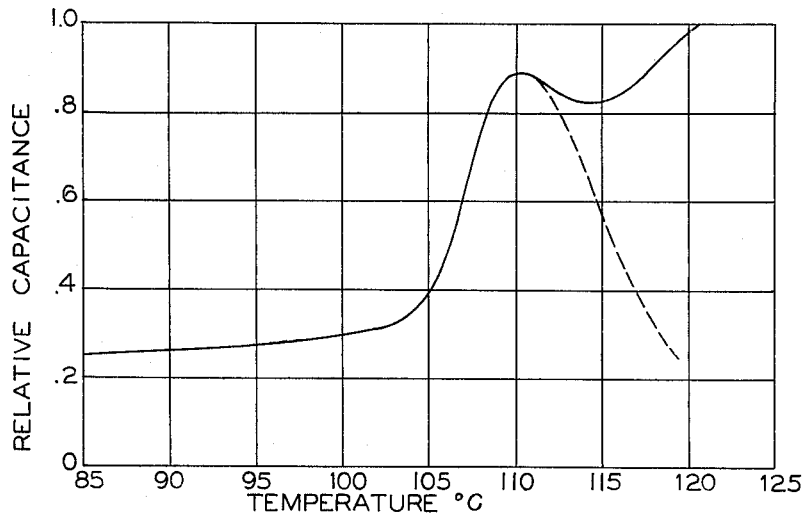
FIG. 5 is a chart illustrating in solid lines certain capacitance-temperature relationships in a circuit such as shown in FIG. 4.
Figure 6:
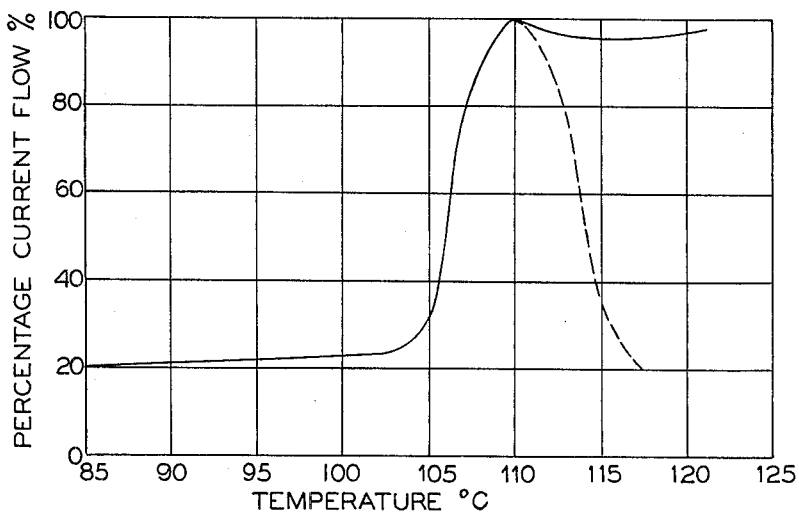
FIG. 6 is a chart showing in solid lines certain current-temperature relationships in a circuit such as shown in FIG. 4.

In FIG. 5 is illustrated in solid lines a typical capacitance-temperature curve for circuit 29 as illustrated in FIG. 4. In FIG. 6 is illustrated in solid lines a typical current-temperature curve for the same circuit. It will be noted that both curves of FIGS. 4 and 5 have a rapid rise of between 105° C. and 110° C., so as rapidly to bring about the operation of relay switch 41 at the critical temperature value for control purposes.

The dotted lines in FIGS. 5 and 6 indicate the falling off of capacity (FIG. 5) and current (FIG. 6) which would occur if the capacitor C (FIG. 4) were constructed of only a single sheet of ferroelectric material, rather than a plurality having different Curie temperatures. The operation of such a construction according to the dotted lines in FIGS. 5 and 6 would, in general, not be satisfactory because, upon temperature overshoot of the motor windings 27, the switch 41 would reclose, thus putting the overheated motor M back on the line 25.

Figure 7:
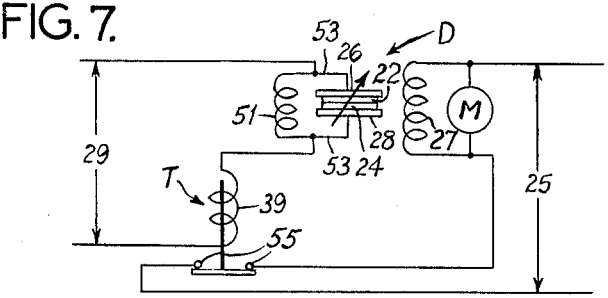
FIG. 7 is a diagram of a motor-protection circuit illustrating another application of the invention employing the FIG. 3 ferroelectric capacitor and a parallel-resonant circuit configuration.

In FIG. 7 is illustrated a parallel-resonant type of circuit employing the form of capacitor shown at D in FIG. 3. In this case the capacitor D is connected in parallel with a coil 51, forming a loop or tank circuit 53. The loop 53 is in series-circuit relation with the coil 39 of a relay switch T, which in this case is of the type which is held closed by adequate current. When the capacitor D is cool, current flows through the coil 39 in the A.C. circuit 29, thus holding closed the contacts 55 of switch T in the motor circuit 25. When the capacitor D becomes hot and the loop 53 resonates, the flow of current to coil 39 is restricted, thus allowing the switch T to open.

While the material for the composite ferroelectric capacitance element has been given as 97% $BaTiO_3$ and 3% $SrTiO_3$, it will be understood that this is not limiting. For example, a ratio of 94% $BaTiO_3$ to 6% $SrTiO_3$ is satisfactory. These ratios are determined in part by the sensitivity of the relay switch S or T employed. Further while the material for layers 21 and 23 has been given as $BaTiO_3$ it will be understood that this is not limiting and that they can be formed of suitable combinations of ferroelectric materials.

The term plate as used herein contemplates any sheet or the like of material sufficient in extent to effect significant capacitance in an electric circuit.

Although capacitors having two ferroelectric plates have been described, it is apparent that groups of more than two of such materials may be employed if desired, so as to more effectively maintain the level of or increase the length of a horizontal line such as 15 in FIG. 1.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An A.C. control circuit comprising an inductance and a capacitance, said inductance and said capacitance having a configuration in the circuit adapted for substantial resonance approximately at the A.C. frequency, said capacitance comprising conductive electrode plates, a plurality of plates of different ferroelectric materials interposed between said conductive plates, at least two of said ferroelectric materials having substantially different Curie temperatures, the capacitive reactance exhibited by said capacitance in the range between said Curie temperatures causing said circuit to be substantially resonant at said A.C. frequency.

2. An A.C. control circuit according to claim 1, wherein said configuration is of the parallel-resonance type.

3. An A.C. circuit according to claim 2, wherein said interposed plates form parallel connections between the electrode plates.

4. An A.C. circuit according to claim 2, wherein said interposed plates are in series-circuit connection between the electrode plates.

5. An A.C. control circuit according to claim 1, wherein said configuration is of the series-resonant type.

6. An A.C. control circuit according to claim 5, wherein said interposed plates form parallel connections between the electrode plates.

7. An A.C. control circuit according to claim 5, wherein said interposed plates are in series-circuit connection between the electrode plates.

8. An A.C. control circuit according to claim 1, wherein one of the ferroelectric materials is barium titanate and the other ferroelectric material is a solid solution of barium titanate and strontium titanate.

9. An A.C. control circuit according to claim 8, wherein the amount of barium titanate in the solution substantially preponderates.

10. A protective circuit for an element subject to heating in one circuit, comprising relay means adapted to open and close said circuit, an exciter coil for the relay means, an A.C. control circuit comprising inductance including said exciter coil and also including capacitance, said capacitance including a capacitor in heat-exchange relation with said element, said capacitor comprising conductive electrode plates, a plurality of plates of different ferroelectric materials interposed between said conductive plates, at least two of said ferroelectric materials having substantially different Curie temperatures, the capacitive reactance exhibited by capacitance of the A.C. circuit in the range between said Curie temperatures causing said A.C. circuit to be substantially resonant at the frequency of said A.C. circuit, said relay means being adapted to open said first-named circuit under said conditions of substantial resonance of the A.C. circuit and to maintain open-circuit conditions of the first-named circuit upon temperature overshoot of said element.

11. A protective circuit for windings of a motor in a motor circuit, comprising relay means adapted to open and close the motor circuit, an exciter coil for the relay means, an A.C. control circuit comprising inductance including said exciter coil and also including capacitance, said capacitance including a capacitor in heat-exchange relation with the motor windings, said capacitor comprising conductive electrode plates, a plurality of plates of different ferroelectric materials interposed between said conductive plates, at least two of said ferroelectric materials having substantially different Curie temperatures, the capacitive reactance exhibited by the capacitance of the A.C. circuit in the range between said Curie temperatures causing said A.C. circuit to be substantially resonant at the frequency of said A.C. circuit, said relay means being adapted to open said motor circuit under said conditions of substantial resonance of the A.C. circuit and to maintain open-circuit conditions of the first-named circuit upon temperature overshoot of said windings.

12. Protective means for an element subject to heating in an electrical circuit; comprising a capacitor in heat-exchange relationship with respect to said element, an electromagnetic relay including an inductive coil and a switch in said circuit controlled by said coil, an A.C. circuit connecting said capacitor and said coil in series-circuit relationship, said capacitor comprising conductive plates and a plurality of plates of different ferroelectric materials interposed therebetween, at least one of said ferro electric materials having a Curie temperature which is different from that of another of the ferroelectric materials.

13. Protective control means according to claim 12, wherein the ferroelectric plates in the capacitor are connected in parallel between its conductive plates.

14. Protective control means according to claim 12, wherein the ferroelectric plates in the capacitor are connected in series between its conductive plates.

15. Protective control means according to claim 14, including another inductive coil with which the capacitor is connected in parallel to form a tank circuit in said A.C. circuit.

16. A capacitor comprising a pair of conductive electrodes, first and second layers of different ferroelectric material interposed therebetween, sair first layer of ferroelectric material being a layer of barium titanate having a first Curie temperature, said second layer being a solid solution of barium titanate and strontium titanate having a second Curie temperature which differs substantially from said first Curie temperature, said barium titanate constituting from 94% to 97% by weight of said solid solution, the remainder being strontium titanate, each of said layers being connected in series between said conductive electrodes.

17. A capacitor comprising a pair of conductive electrodes, and first and second layers of ferroelectric material interposed therebetween, said first layer comprising a layer of barium titanate and said second layer comprising a solid solution of barium titanate and strontium titanate, said barium titanate constituting from 94% to 97% by weight of said solid solution, the remainder being strontium titanate.

18. A protective circuit for an electrical device subject to heating comprising means including a relay for selectively energizing said device, an A.C. control circuit for said relay, said control circuit comprising an inductive component and a capacitor, the latter being located in heat-exchange relation with said device, said capacitor comprising a pair of conductive electrodes, and first and second layers of different ferroelectric material interposed between said electrodes, one of said ferroelectric materials having a Curie temperature which differs substantially from that of the other material, the capacitive reactance exhibited by said capacitor in a range between the Curie temperatures of said different ferroelectric materials causing said control circuit to be substantially resonant at the A.C. frequency of said control circuit, said relay being actuated selectively to control said electrical device under conditions of substantial resonance of said A.C. control circuit.

19. A protective circuit as set forth in claim 18 wherein said inductive component and said capacitor are connected in parallel to form a parallel-resonant circuit under said conditions of substantial resonance of said control circuit.

20. A protective circuit as set forth in claim 18 wherein said inductive component and said capacitor are connected in series to form a series-resonant circuit under said conditions of substantial resonance of said control circuit.

21. A protective circuit as set forth in claim 18 wherein said first layer of ferroelectric material is a layer of barium titanate, and said second layer is a solid solution of barium titanate and strontium titanate, said barium titanate constituting from 94% to 97% by weight of said solid solution, the remainder being strontium titanate.

References Cited by the Examiner

UNITED STATES PATENTS

| | | | |
|---|---|---|---|
| 2,520,376 | 8/50 | Roup et al. | 317—258 |
| 2,633,543 | 3/53 | Howatt | 317—258 |
| 2,683,856 | 7/54 | Kornei | 322—2 |
| 2,794,940 | 7/57 | Roup | 317—258 |
| 2,838,723 | 6/58 | Crownover et al. | 317—258 |
| 2,960,613 | 11/60 | Spitzer | 317—258 |
| 3,054,048 | 9/62 | Dolston et al. | 317—133 |
| 3,059,144 | 10/62 | Bowerman | 340—173 |

FOREIGN PATENTS 292,922  2/29  Great Britain.

OTHER REFERENCES

Properties of Barium-Strontium Titanate Dielectrics, Part of the Journal of Research of the National Bureau of Standards, vol. 38, March 1947, Research Paper RP. 1776, pages 337–349.

The Measurement of Dielectric Properties, pages 61, 62, Proceedings of the I.E.E., vol. 97, Part 1, No. 104, March 1950.

Nonlinear Condensers, pages 3, 4, 5, 24, 25, Radio-Electronic Engineering, May 1953.

SAMUEL BERNSTEIN, *Primary Examiner.*

UNITED STATES PATENT OFFICE
CERTIFICATE OF CORRECTION

Patent No. 3,210,607                                                               October 5, 1965

Charles D. Flanagan

It is hereby certified that error appears in the above numbered patent requiring correction and that the said Letters Patent should read as corrected below.

Column 3, line 37, for "designated" read -- designed --; column 4, line 26, for "the like of" read -- like form of --; column 5, line 65, for "sair" read -- said --.

Signed and sealed this 31st day of May 1966.

(SEAL)

Attest:

ERNEST W. SWIDER                                       EDWARD J. BRENNER

Attesting Officer                                           Commissioner of Patents